United States Patent [19]

Indri

[11] 4,130,452

[45] Dec. 19, 1978

[54] PROCESS OF CONSTRUCTING A CERAMIC CATALYST SUPPORT

[76] Inventor: John L. Indri, Rte. #33 R.D. #1 Box 523, Hightstown, N.J. 08520

[21] Appl. No.: 795,379

[22] Filed: May 10, 1977

[51] Int. Cl.$^2$ ............................................. C04B 39/12
[52] U.S. Cl. ..................... 156/89; 156/155; 156/253; 156/264; 156/289; 156/290
[58] Field of Search ............... 156/89, 155, 252, 253, 156/289, 290, 291, 264; 428/166, 167, 168, 178, 179, 180, 198, 201, 210

[56] References Cited

U.S. PATENT DOCUMENTS

| 1,595,006 | 8/1926 | Kelly et al. ............................ 156/155 |
| 3,279,931 | 10/1966 | Olcott ..................................... 156/89 |
| 3,320,044 | 5/1967 | Cole et al. .............................. 156/89 |
| 3,940,301 | 2/1976 | Straw ...................................... 156/89 |
| 4,026,746 | 7/1977 | Straw ...................................... 156/89 |

FOREIGN PATENT DOCUMENTS 927921 6/1963 United Kingdom ...................... 156/89

Primary Examiner—Caleb Weston

[57] ABSTRACT

A method of producing a ceramic device having thin walls of microporous ceramic material, channels open at both ends, and a large exposed internal surface area. The method comprises preparation of a unique bilayer film and assembly of this film into a ceramic device by rolling it upon itself into a spiral cylinder or by arranging it in stacks of sheets. One layer of the film is composed of ceramic powder in an organic binder; the other of a material which may be removed by physical or chemical means.

30 Claims, 2 Drawing Figures

PROCESS OF CONSTRUCTING A CERAMIC CATALYST SUPPORT

SUMMARY DESCRIPTION OF THE DEVICE PRODUCED BY THIS INVENTION

The ceramic device of this invention has a plurality of parallel walls connected to each other by spacers and arranged in a regular pattern which may be in the form of a spiral or be in the form of flat sheets stacked upon each other as shown in FIGS. 1-2 respectively. The arrangement of the walls forms a multiplicity of channels running through the device which are interrupted only by the spacers joining adjacent walls, and are open at both ends. Spacers connect adjacent walls at regular intervals through the structure to give the device integrity and strength. The spacers may have any cross section but circular or rectangular cross sections are preferred. They may be arranged regularly (e.g., in parallel rows) or irregularly. The composition of the walls and spacers may be of any desired ceramics: examples include petalite, cordierite, alumina silicates, alumina-silica-magnesia, zircon, mullite or alpha alumina. If desired the walls may have one or more layers of differing ceramic materials.

In the preferred embodiment of the invention the walls range between 0.005 inch to 0.012 inch in thickness and the distance separating walls is in the range 0.005 inch to 0.030 inch. The width of the spacers is in the range 0.010 inch to 0.300 inch: they may be of any desired length. This distance between spacers is in the range 0.010 inch to 0.300 inch. This invention is not however limited to producing a device with the dimensions here indicated.

The object of the invention is to provide a method of constructing a ceramic device which may serve as a catalyst support, whereby the device is formed in a substantially continuous process on conventional machinery with or without minor modifications obvious to those skilled in the art. It should be further understood that this ceramic catalyst support, on coating with an appropriate catalyst, for instance a metal or metals from Group IIA, IB, VB, VIB, VIIB, and VIII, could be suitable for use as a catalytic converter for the conversion of harmful automobile pollutants into innocuous materials.

Several patents describe methods of constructing a ceramic device having thin microporous walls and channels open at both ends. U.S. Pat. Nos. 3,824,196 and 3,983,283 describe the extrusion of structures containing many channels from a plastic composition of the desired ceramic. Other patents describe methods of producing sheets of ceramic. These sheets are then stacked together in a manner that provides for channels between adjacent sheets. In most cases the sheets must be wavy or corrugated.

U.S. Pat. No. 3,926,702 describes the preparation of sheets by preparing a fluid suspension of ceramic powder in a phenolic resin that has been dissolved in alchohol and flowing this into a wavy mold that is subsequently heated to drive off the alchohol, then further heated to fire the ceramic. The single sheet produced from the mold is combined with sheets produced similarly to produce the device.

U.S. Pat. No. 3,982,981 describes a method whereby sheets of ceramic are prepared in a continuous process on a fourdrinier paper machine from a suspension of ceramic powder and natural or synthetic fibers. After sheets so produced have been corrugated they are assembled with each other into a device.

U.S. Pat. No. 3,948,810 describes a device whereby sheets of ceramic (formed in a process not described in the patent) are assembled in layers alternating with layers of ceramic balls or sheres that have been formed in a separate process not specified in the patent.

U.S. Pat. No. 3,963,504 describes a process by which a thermoplastic composition of ceramic powder, high molecular weight polyolefin, and plasticizer are formed into a sheet by pressing between two platens in an hydraulic press. After the sheets are assembled together the plasticizer is removed by solvent causing the sheets to become inflexible.

The instant invention described herein differs from those mentioned in that it describes formation of a ceramic sheet by coating onto a substrate sheet. None of the patents cited make use of a coating process. Further the substrate sheets performs several unique functions:
1. It supports the ceramic film
2. In the second embodiment of the invention, it serves to define the form of the ceramic sheet (the production of extensions in in the film that become spacers).
3. When the sheets are assembled into a device, it serves to space the sheets of ceramic equidistant and prevent their premature collapse by physically occupying the space that will remain open in the finished device.
4. In the first embodiment, it physically occupies the space that later will become open; thus allowing spacers to be produced by the technique to subsequently be described herein.

DESCRIPTION

Figure 1:
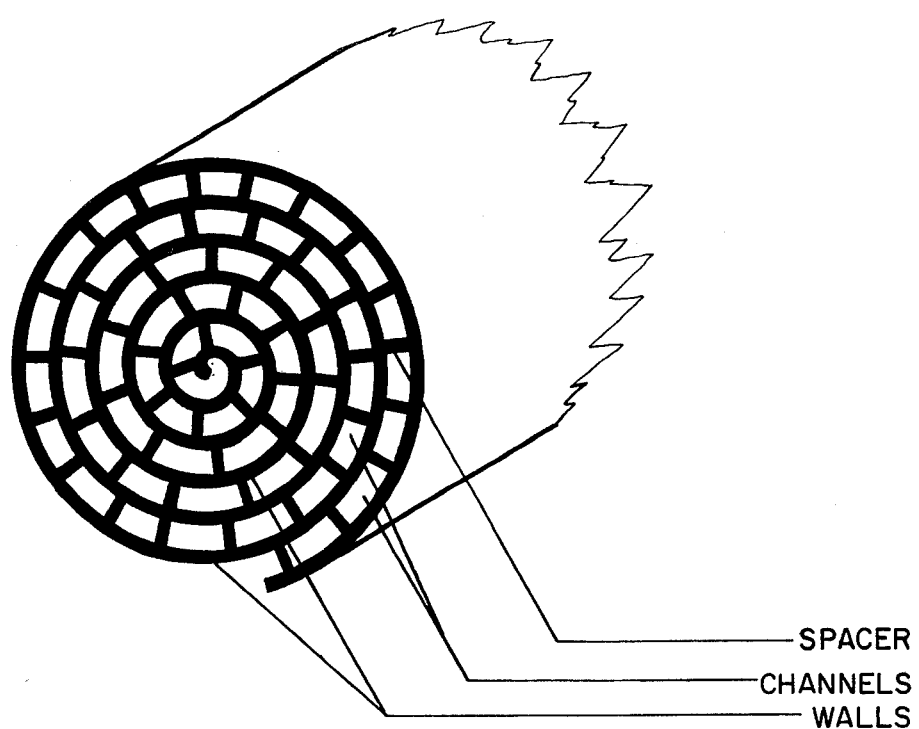
FIG. 1 is a view of a ceramic device made by rolling a bicomponent sheet upon itself.
Figure 2:
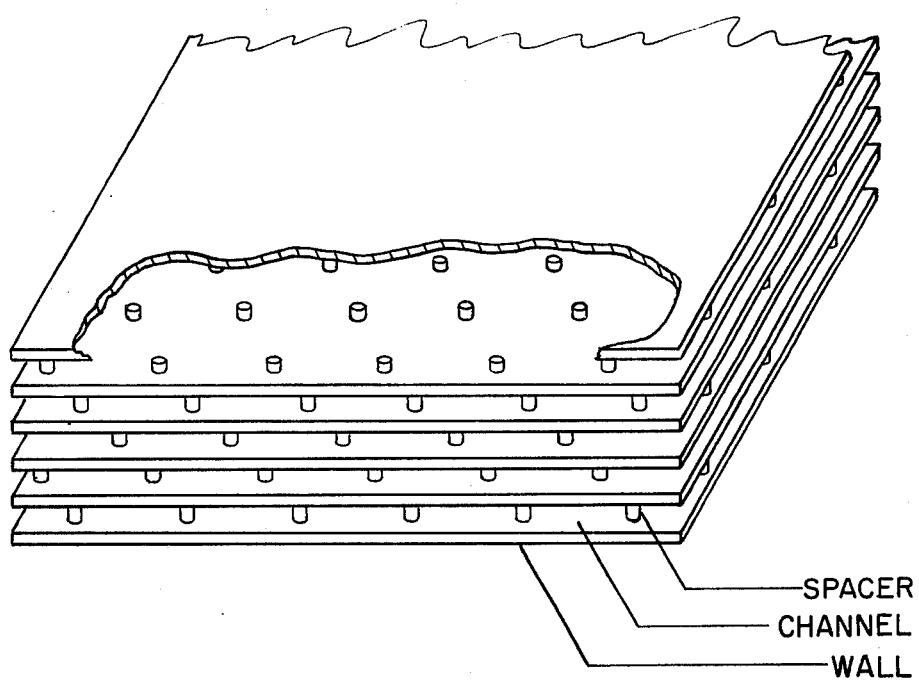
FIG. 2 is a view of a ceramic device made by stacking bicomponent sheets one upon the other.

The essence of the present invention lies in the construction of a unique bicomponent film. The film is formed by coating a suspension of ceramic powder in an organic binder over a film composed of wax, plastic, or paper. In the simplest embodiment of this invention, a fluid mixture of solvent, organic binder, and ceramic powder is coated onto a flexible sheet by any of the many methods common to the art. This flexible sheet may be self-supporting or be supported by a paper web. The flexible sheet may also be formed by coating the film-forming material directly onto a properly prepared paper web.

The solvent is evaporated off to provide a bicomponent film composed of a continuous layer of ceramic in binder and a continuous layer of the flexible sheet. The organic binder may be any one of a number of substances capable of being cured to a rigid insoluable form. Preferred are thermosetting resins such as phenolics, urea-formaldehyde, melamine-formaldehyde, and epoxy resins. The flexible sheet is composed of any one of many materials that either form films or are available commercially as films and can be removed by heat, solvents or chemical attack. Suitable materials include waxes and modified celluloses. The bicomponent film so produced may be rolled up into a spiral cylinder or cut into sheets and the sheets stacked together.

If a paper web has been used for support, this is separated and discarded. Paper coated with release agent is preferable since it facilitates this separation and may be re-used. Gaps are formed perpendicular to the plane of the sheets by drilling, punching, or sawing. These gaps are filled with a suspension of ceramic in binder preferably but not necessarily similar to that used in the coating process.

The ceramic in the gaps ultimately forms the supporting spacers. When these operations have been completed, the organic binder is cured to a rigid insoluable form. Following this, the removable layer is extracted typically, though not necessarily, by dissolution in a suitable solvent, or by melting. The structure so formed is heated to carbonize the binder and then heated further to fire the ceramic. Similar carbonization and firing sequences are described in U.S. Pat. No. 3,926,702 and other patents.

In a second embodiment of this invention, a unique bicomponent film is prepared having spacers as an integral part of the film rather than requiring their formation at a later stage, as described in the first embodiment of the invention. This film is produced by the following steps:

1. A sheet of suitable material is perforated. The composition of this sheet would correspond to that of the removable layer previously described. The perforations, whose shape determines the cross section of the spacers, may be of any design, but may conveniently be made circular or rectangular.
2. The sheet so prepared is laminated to a support sheet (for instance a paper web) in such a way that the two sheets may be separated by peeling them apart. This second sheet will be-called the release sheet.
3. A coating material is prepared from a suitable binder and selected ceramic powder and may include a solvent for the binder. This suspension is coated by conventional methods well known in the art on to the composite sheet prepared according to step two. The coating must remain fluid long enough for it to fill the perforations. The solvent is then removed by evaporation.
4. Prior to assembling the film into the structure of the support, the release sheet is removed as indicated in the description of the first embodiment.
5. The finished support is heated to carbonize the binder and then heated further to fire the ceramic. During the firing process the carbon burns off.

Bicomponent films of this type differ from these discussed in the first embodiment of the invention in having a multiplicity of ridges or pillars that penetrate the second layer and are flush with the surface of this layer. When this bicomponent film is rolled up or assembled into a stack of sheets these pillars or ridges make contact with the adjacent ceramic layer. During the curing process these points of contact band together, thus forming the spacer supports. In either embodiment, application of the ceramic binder layer is not limited to one coating pass. In some cases it may be desirable to have two ceramics in the finished support or may be desirable to use two different binders to facilitate the shaping of the support. Both of these objectives can be accomplished by applying a second coating over the first after the first layer is hardened. In another variation of this invention, wax is coated directly onto release paper. This wax may be coated using a special roll that leaves portions of the release sheet without a coating of may be coated solid and later perforated without perforating the release sheet.

EXPERIMENTAL

100 Parts of wt. of resin PMH707 were added to 45 parts of wt. of PMH707 hardener (Palmer Products, Inc.) and the resulting mixture dissolved in tolulene. To one part of the resin and hardener 4 parts by wt. of #613 calcined alumina A-10 (Whittaker, Clark, and Daniels, Inc.) were added. The alumina, resin and solvent were thoroughly mixed to produce a coating slurry. An 0.018 inch thick beeswax sheet from A.I. Root Co. was perforated with holes about 0.035 inch in diameter and spaced about 0.250 inch apart in a staggered pattern using a hollow punch.

Layers of tape were placed 0.500 inch apart on the punched out section of the beeswax sheet and the sheet was placed on release paper. The coating was spread between the pieces of tape by use of a stiff blade. The coating was about 0.009 inch thick. After the solvent was evaporated, the coated area was cut from the beeswax sheet and wrapped around a 0.500 inch spindle. The sample had seven layers. The epoxy was allowed to harden at room temperature for 10 days. The sample was put in an oven at 200° F. and the wax melted out. Subsequently the binder was carbonized at 500° F.

The resulting sample was circular and measured 13/16 inch in diameter, had a ½ inch open area in the center, and was ⅜ inch high. The sample had six channels which were open along their entire length except for their spacers.

I claim:

1. A method of making a ceramic device having a plurality of thin walls of microporous ceramic material separated by spacers possessing channels open at both ends and a large exposed internal surface area; said device suitable upon coating with appropriate catalyst for use in the catalytic conversion of harmful exhaust pollutants into innocuous materials; said method comprising the following steps:
   i. coating a mixture containing a ceramic powder, a curable organic binder, and a liquid suspending medium onto a substrate sheet wherein the characteristics of said sheet allows it to be subsequently removed in later stages of the method;
   ii. solidifying the coating by removal of the suspending medium to form a bicomponent sheet;
   iii. assembling the bicomponent sheet into a structure by cutting the sheet into individual sheets and stacking these upon one another or by rolling said sheet upon itself to form a cylinder;
   iv. forming a series of holes at right angles to the plane of the sheets;
   v. filling the holes so formed with a mixture of ceramic powder in a curable organic binder;
   vi. curing the organic binders of steps i. and v.;
   vii. removing the material of the original substrate sheet;
   viii. heating to burn off the organic binder and fire the ceramic.

2. The method of claim 1 wherein the liquid suspending medium is a solvent for the organic binder.

3. The method of claim 1 wherein the suspending liquid is removed by evaporation.

4. The method of claim 1 wherein subsequent to the solidifying of the coating as described in step ii a second coating which may differ from the first coating in the composition of the binder or the ceramic is applied as described in steps i and ii.

5. The method of claim 1 wherein a structure composed of parallel sheets is formed by cutting the bicomponent sheet into individual sheets and stacking these one upon another.

6. The method of claim 1 wherein a cylinder is formed by rolling the bicomponent sheet upon itself or upon a spindle.

7. The method of claim 1 wherein the holes are formed by punching, sawing, or drilling.

8. The method of claim 1 wherein the ceramic powder and organic binder used in filling the holes are the same as those used in the coating step.

9. The method of claim 1 wherein the binder is cured by application of heat.

10. The method of claim 1 wherein the material of the original substrate is removed by solvent extraction.

11. The method of claim 1 wherein the material of the original substrate sheet is removed by heating so that the material melts or vaporizes.

12. The method of claim 1 wherein the ceramic material is petalite, corderite, alpha alumina, alumina-silica-magnesia, alumina-silicate, zircon, or mullite.

13. The method of claim 1 wherein the organic binder is a thermosetting resin such as phenolics, urea formaldehyde, melamine, or epoxy resin.

14. The method of claim 1 wherein the walls of the finished ceramic device are in the range of 0.005 inch to 0.012 inch in thickness, wherein the distance separating walls is in the range of 0.005 inch to 0.030 inch; and the distance between spacers is in the range of 0.010 inch to 0.300 inch.

15. The method of claim 1 wherein the substrate sheet is a wax or wax like substance of low melting point and the binder contains a catalyst that accelerates the cure of the binder at low temperatures.

16. The method of claim 1 wherein the substrate sheet is supported by a second sheet during the coating and solidifying of the ceramic mixture and the second sheet is removed from the substrate sheet prior to step (iii).

17. The method of claim 16 wherein the substrate sheet is formed by coating a film-forming material directly on a properly prepared second sheet.

18. A method of making a ceramic device having a plurality of thin walls of microporous ceramic material separated by spacers, possessing channels open at both ends and a large exposed internal surface area; said device suitable upon coating with appropriate catalyst for use in the catalytic conversion of a fluid stream of substances into desired reaction products, as in the conversion of harmful automobile exhaust pollutants into innocuous materials: said method comprising the following steps:

i. laminating a perforated substrate sheet, wherein the characteristics of said substrate sheet allows it to be subsequently removed in later stages of the method, to a support sheet which may be a paper web, in such a manner that the substrate sheet and the support sheet may be separated by peeling them apart;

ii. coating a mixture containing a ceramic powder, a curable organic binder, and a liquid suspending medium onto the perforated substrate sheet such that the coating fills the perforations;

iii. solidifying the coating by removal of the suspending medium to form a bicomponent sheet;

iv. separating the support sheet from the substrate sheet;

v. assembling the bicomponent sheet into a structure by cutting the sheet into individual sheets and stacking these upon one another or by rolling said bicomponent sheet upon itself to form a cylinder;

vi. curing the organic binder;

vii. removing the material of the original substrate sheet;

viii. heating to burn off the organic binder and fire the ceramic.

19. The method of claim 18 wherein a structure composed of parallel sheets is formed by cutting the bicomponent sheet into individual sheets and stacking these one upon another.

20. The metod of claim 18 wherein a cylinder is formed by rolling the bicomponent sheet upon itself or upon a spindle.

21. The method of claim 18 wherein the liquid suspending medium is a solvent for the organic binder.

22. The method of claim 18 wherein the suspending liquid is removed by evaporation.

23. The method of claim 18 wherein subsequent to step (v) of claim 16 a second coating which may differ from the first coating in the composition of the binder or the ceramic is applied to the substrate sheet.

24. The method of claim 18 wherein the binder is cured by application of heat.

25. The method of claim 18 wherein the material of the substrate sheet is removed by solvent extraction.

26. The method of claim 18 wherein the material of the substrate sheet is removed by heating so that the material of the substrate sheet melts or vaporizes.

27. The method of claim 18 wherein the ceramic material is petalite, corderite, alpha alumina, alumina-silica-magnesia, alumina-silicate, zircon, or mullite.

28. The method of claim 18 wherein the organic binder is a thermosetting resin such as phenolics, urea formaldehyde, melamine, or epoxy resin.

29. The method of claim 18 wherein the walls of the finished ceramic device are in the range of 0.005 inch to 0.012 inch in thickness, wherein the distance separating walls is in the range of 0.005 inch to 0.030 inch; and the distance between spacers is in the range of 0.010 inch to 0.300 inch.

30. The method of claim 18 wherein the substrate sheet is a wax or wax like substance of low melting point and the binder contains a catalyst that accelerates the cure of the binder at low temperatures.

* * * * *